Apr. 17, 1923.
S. A. SANDBERG ET AL
1,452,170
LEVER CONTROL FOR CLUTCH PEDALS
Filed May 15, 1922
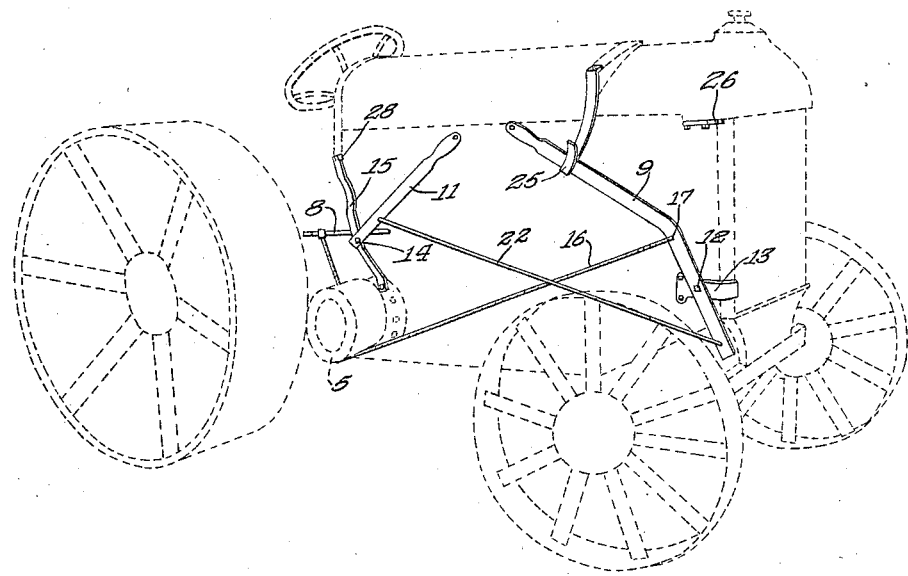
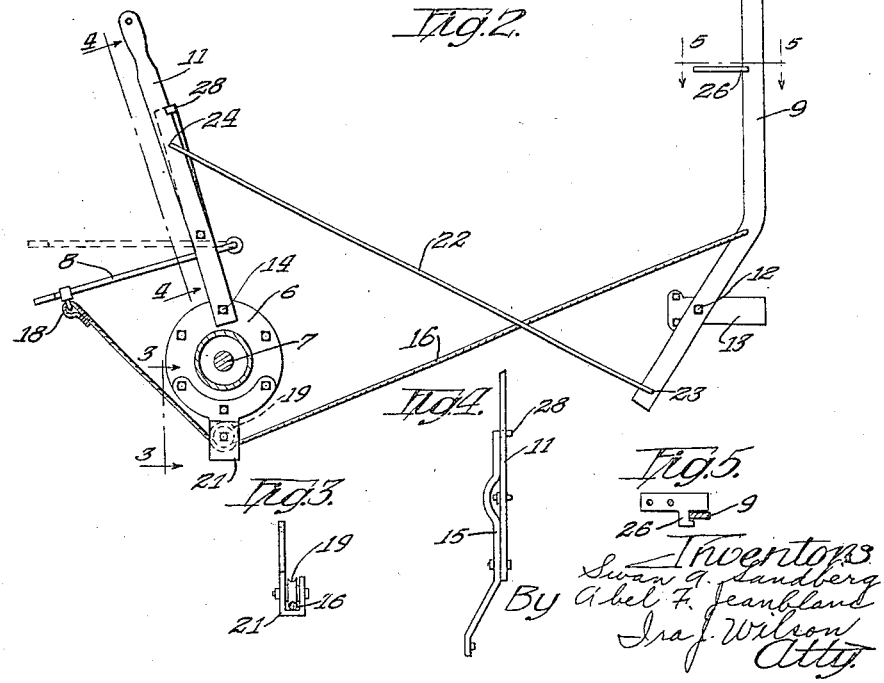
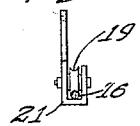
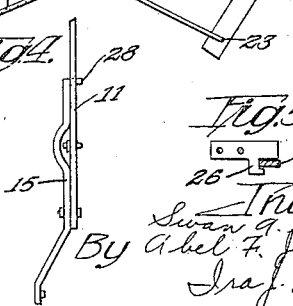

Patented Apr. 17, 1923.

1,452,170

UNITED STATES PATENT OFFICE.

SWAN A. SANDBERG AND ABEL F. JEANBLANC, OF LEE CENTER, ILLINOIS.

LEVER CONTROL FOR CLUTCH PEDALS.

Application filed May 15, 1922. Serial No. 561,055.

*To all whom it may concern:*

Be it known that we, SWAN A. SANDBERG and ABEL F. JEANBLANC, citizens of the United States, residing at Lee Center, in the county of Lee and State of Illinois, have invented certain new and useful Improvements in Lever Controls for Clutch Pedals, of which the following is a specification.

This invention pertaining in general to motor vehicles, has more particular reference to the means for engaging and disengaging the clutch. It is common practice to provide a foot pedal for this purpose, and as used on tractors this clutch pedal is in many instances inconvenient to operate, and especially so under emergencies when the power pulley is used and the operator is on the ground.

The primary object therefore, of the present invention is to provide a new and improved means for enabling quick, safe and convenient operation of the clutch pedal by the operator on the ground. More particularly, we have aimed to provide a front and a rear hand lever so mounted on the tractor and connected with each other and with the clutch pedal that either lever may be directly operated from any position around the tractor to engage and disengage the clutch, or from a position remote from the tractor as through means of a rope connected to the lever, as will be explained more fully hereinafter.

Another object of our invention is to provide as an attachment to a tractor, a system of automatically operating levers of the character described which may be produced at a comparatively low cost and which may be easily applied.

Still another object resides in the provision of a hand lever attachment for tractors so connected with the clutch pedal as to be operable for engaging and disengaging the clutch in place of shifting gears when starting and stopping, this being especially desirable when the tractor is used in the field, as it lessens the danger of grinding the gears by reason of improper shifting which among other reasons is sometimes occasioned by the operator's attention to other control of the tractor and handling of the implement being drawn. This phase of our improvements is also especially desirable when the tractor is handled by young boys, inasmuch as the hand lever control with its leverage advantage is exceedingly simple, safe and easier to manipulate than is the direct operation of the clutch pedal in conjunction with the gear-shifter.

Other objects and attendant advantages will be appreciated by those familiar with this art as the invention becomes better understood by reference to the following description when considered in connection with the accompanying drawings, in which—

Figure 1 is a perspective view illustrating the application of our improvements to a tractor, showing the hand levers in the clutch-engaged position;

Fig. 2 is a side elevation of our improvements showing the hand levers in the clutch-disengaged position; and Figs. 3, 4 and 5 are detail views taken substantially on the lines 3—3, 4—4 and 5—5, respectively, of Fig. 2.

Our improvements are applicable in general, to motor vehicles, and particularly to tractors. The tractor shown in outline in Fig. 1 is merely for purpose of illustration and embodies a power pulley 5, the power pulley bracket 6 and drive shaft 7 being shown in Fig. 2. The foot pedal 8 is for engaging and disengaging the clutch as is well understood in this art.

Our invention in its preferred embodiment comprehends the provision of a pair of hand levers 9 and 11 mounted respectively at forward and rearward positions on the tractor. In the present instance, the front hand lever 9 is pivotally mounted intermediate its ends at 12 on a bracket 13 attached to the tractor. The rear hand 11 is pivotally mounted at its lower end at 14 on a bracket 15 attached to the tractor. A flexible connection in the form of a rope or cable 16 connects the front hand lever above its pivot at 17 with the clutch pedal 8 at 18 and is run intermediate its ends under a pulley 19 supported on the tractor by a suitable bracket 21. The front and rear hand levers are connected by an inflexible connection in the form of a rod 22. This rod as plainly shown, is connected at its forward end 23 to the front lever 9 below its pivot 12 and at its rear end 24 to the rear hand lever above its pivot 14. By reason of the spring pressure employed for engaging the clutch, the clutch pedal 8 will normally be held in the clutch-engaged position. Consequently, the parts connected with the clutch pedal will normally assume the position shown in Fig. 1. In this position, it will be observed that the front hand lever rests at its upper end on a suitable stop provided by the strap iron bracket 25.

When it is desired to release or disengage the clutch the front hand lever may be pulled forwardly to the position shown in Fig. 2 and engaged behind a stop 26 attached to the tractor. By attaching a cable or rope 27 to this lever, it may be operated from a point remote from the tractor, as for example, from the machine being driven by the tractor. In this way, one operator can control the drive while attending to the machine being driven. Likewise the rear hand lever 11 may be operated either from the rear or side of the tractor and also from the rear by a rope attached to the lever as will be obvious. It will be noted that the rear hand lever is not connected directly to the clutch pedal but operates through the intermediary of a front lever. The rear hand lever may be locked in the clutch-released position by engagement behind a stop 28 on the upper end of the bracket 15. In the position shown in Fig. 2, both hand levers are engaged behind their respective stops, and when either is drawn forwardly or rearwardly as the case may be to disengage from its respective stop, the other will be likewise disengaged, and by reason of a spring tendency in the lever, it will spring outwardly clear of its respective stop, thus permitting movement to the clutch-engaged position.

It will be readily seen from the foregoing that the clutch may be engaged or disengaged from any side of the machine by an operator on the ground, and that the clutch may be disengaged from points remote from the tractor. The rear hand lever 11 also affords a very simple and practical hand control for starting and stopping the tractor when used on the road or in the field, and when the gear shifter lever is in either the first or the second speed position. This enables most convenient control of the tractor and avoids grinding the gears which frequently results from hasty or improper manipulation of the clutch pedal and gear-shifter lever.

It is believed that the foregoing conveys a clear understanding of the objects prefaced above, and while we have illustrated but a single working embodiment, it should be understood that changes might be made in details of construction without departing from the spirit and scope of the invention as expressed in the appended claims.

We claim:

1. In a tractor, the combination with the clutch pedal, of a handle mounted at a forward position and another at a rearward position on the tractor, and connections between said levers and clutch pedal for moving the latter in a direction to disengage the clutch upon movement of either the front hand lever forwardly or the rear hand lever rearwardly.

2. In a tractor, the combination with the clutch pedal, of a front hand lever on the tractor connected with the clutch pedal and movable forwardly for disengaging the clutch, and a rear hand lever on the tractor connected with the front hand lever and movable rearwardly for operating said front hand lever for disengaging the clutch.

3. In a tractor, the combination with the clutch pedal, of a hand lever mounted at a forward and another at a rearward position on the tractor, a flexible connection between the front hand lever and the clutch pedal, whereby the latter may be moved to disengage the clutch by swinging said front lever forwardly, and a connection between said front and rear levers, whereby the latter when swung rearwardly will operate the former for disengaging the clutch.

4. In a tractor, the combination with the clutch pedal, of a hand lever mounted forwardly on the tractor, a flexible connection connected at its front and rear ends to said lever and clutch pedal respectively, a pulley positioned below said clutch pedal and under which said flexible connection is run, a hand lever mounted rearwardly on the tractor, and a connection between said hand levers, whereby either lever may be operated for engaging and disengaging the clutch.

5. In a tractor, the combination with the clutch pedal, of a hand lever mounted forwardly on the tractor, a flexible connection connected at its front and rear ends to said lever and clutch pedal respectively, a pulley positioned below said clutch pedal and under which said flexible connection is run, a hand lever mounted rearwardly on the tractor, a connection between said hand levers, whereby either lever may be operated for engaging and disengaging the clutch, and means for holding either lever in the clutch-disengaging position.

6. The combination with the clutch pedal of a tractor, of a hand lever mounted at a forward position on the tractor, a connection between said lever and the clutch pedal for operating the latter, and means for holding said lever in a clutch-disengaging position.

SWAN A. SANDBERG.
ABEL F. JEANBLANC.